(12) United States Patent
Amkreutz

(10) Patent No.: US 6,402,649 B1
(45) Date of Patent: Jun. 11, 2002

(54) BELT INSTALLATION TOOL

(75) Inventor: Frank Amkreutz, Aachen (DE)

(73) Assignee: The Gates Corporation, Denver, CO (US)

( * ) Notice: Subject to any disclaimer, the term of this patent is extended or adjusted under 35 U.S.C. 154(b) by 0 days.

(21) Appl. No.: 09/705,173

(22) Filed: Nov. 2, 2000

(51) Int. Cl.$^7$ .................................................. F16H 7/24
(52) U.S. Cl. ........................................................ 474/130
(58) Field of Search ............................ 474/130; 254/131

(56) References Cited

U.S. PATENT DOCUMENTS

| | | | | |
|---|---|---|---|---|
| 478,260 A | * | 7/1892 | Hammesfahr ................ | 474/130 |
| 654,052 A | * | 7/1900 | Cliff et al. .................... | 474/130 |
| 680,063 A | * | 9/1901 | Montgomery et al. ...... | 474/130 |
| 720,566 A | * | 2/1903 | Coulter ......................... | 474/130 |
| 1,651,063 A | * | 11/1927 | Keller .......................... | 474/130 |
| 4,109,544 A | | 8/1978 | Clark .......................... | 74/242.7 |
| 4,111,063 A | | 9/1978 | Journey ....................... | 74/242.6 |
| 4,193,310 A | | 3/1980 | Boyer et al. ................ | 74/230.3 |
| 4,325,703 A | | 4/1982 | Phillips ........................ | 474/130 |
| 5,318,479 A | | 6/1994 | Lawroski ..................... | 474/130 |
| 6,033,331 A | | 3/2000 | Winninger et al. .......... | 474/260 |

FOREIGN PATENT DOCUMENTS

| | | | | |
|---|---|---|---|---|
| EP | 0 831247 | 3/1998 | ............. | F16G/5/20 |

* cited by examiner

Primary Examiner—David A. Bucci
Assistant Examiner—Vicky A. Johnson
(74) Attorney, Agent, or Firm—J. A. Thurnau, Esq.; C. H. Castleman, Esq.; S. G. Austin, Esq.

(57) ABSTRACT

The invention comprises a belt installation tool for installing a flexible belt on a pulley. On one side, the radius of the tool is substantially equivalent to the radius of a pulley flange. The bearing surface on this side of the tool stretches the belt and guides the belt onto the pulley. To avoid damaging the belt, the radius of the tool and the pulley flange should be substantially equal over a substantial length of the pulley. Centric to this radius, a hole is provided to accommodate a single-end socket that projects through the tool. The socket engages a crankshaft bolt, hence, the belt installation tool is centered on the pulley along the socket centerline. The tool and pulley are then turned with a ratchet attached to the socket. The tool comprises a belt bearing surface having a variable radius that allows a belt to be stretched to a proper radius without abrupt radius changes, which could damage a belt. The belt is moved axially from the tool into the pulley grooves by a leaderblock, which is provided at the tool radius on the bearing surface adjacent to the pulley grooves. By turning the tool about the crankshaft the leaderblock guides the belt flank, causing it to move into a pulley groove. The leaderblock comprises a lip to further hold the tool on a pulley rim.

4 Claims, 3 Drawing Sheets

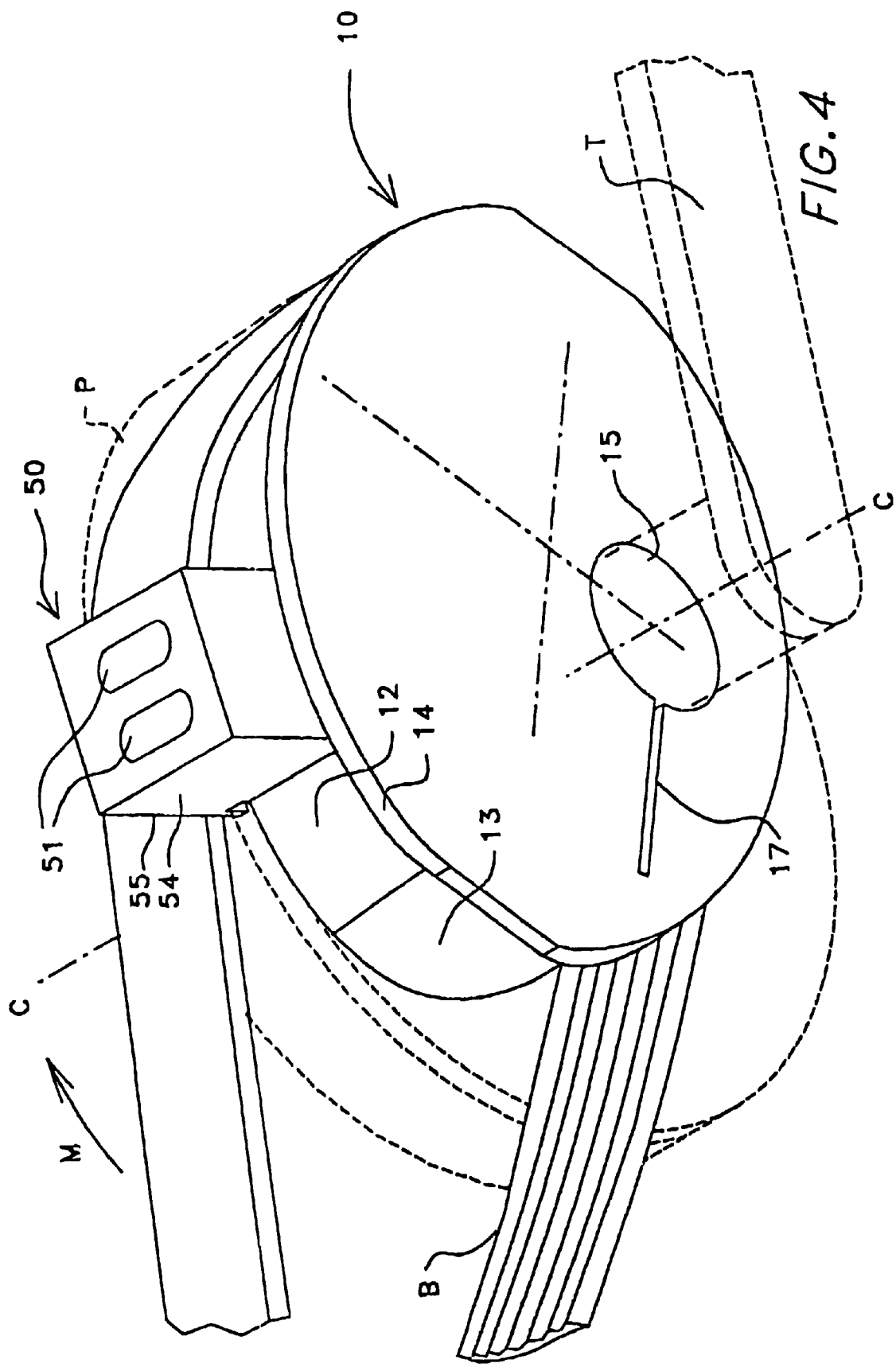

BELT INSTALLATION TOOL

FIELD OF THE INVENTION

The invention relates to belt installation tools and more particularly to a belt installation tool having an eccentric ramp surface whereby a flexible drive belt is stretched and progressively guided into a pulley groove.

BACKGROUND OF THE INVENTION

Belt drive systems comprise a significant and widely used form of mechanical power transmission. Generally a belt runs between two or more pulleys, more particularly a driver and driven pulley.

In order to efficiently transmit power between the pulleys the belt is installed with a predetermined preload or tension. The amount of tension is generally a function of the horsepower and torque requirements of the drive. An increased horsepower or torque requirement will generally require a commensurate increase in the tension of the belt.

In order to achieve the proper tension, one or more of the pulleys is loosened so the shaft or shafts can be moved to allow a slack condition in the belt. Then, the belt is looped over the pulleys. The loosened pulley or pulleys are then pulled or tightened in a predetermined position, resulting in a tension in the belt. This process requires the pulley(s) to be mechanically adjusted to properly tension the belt.

Belts may be installed on pulley systems using other methods. For systems with an automatic tensioning device the tensioner is loaded, the belt is placed in an operating position, and the tensioner is released to its operational location. For systems without a tensioner, belts are wrapped around the pulleys and then a pulley is tightened to its final location by a bracket or similar devices.

Another method of installing a belt involves use of a tool that presses the belt into a pulley groove without the need for mechanically adjusting the pulleys. The tool is used adjacent to a pulley. It stretches the belt while laterally forcing it into a pulley groove.

Representative of the prior art is European Patent No. 0 831 247 B1 to Hutchinson which discloses a tool having a radial thrust area resting against a girth of the pulley, keeping a belt away from a pulley until it reaches a plane spaced from a pulley surface.

Also representative of the art is U.S. Pat. No. 4,193,310 (1980) to Boyer et al. which discloses a pulley having a diverging means extending radially and laterally from the rim for engaging and seating the belt on the pulley rim. This invention does not comprise a bearing surface for gradually entraining a belt on a pulley, instead having a peg that abruptly bends the belt into the pulley groove.

The prior art apparatus forces a belt to bend over small radius portions of the tool, causing high stress concentrations that damage the belt during installation. Further, high lateral loads damage the sidewalls of the belt. Finally, the transverse motion of the belt as it moves into the pulley groove may also damage the belt.

What is needed is a belt installation tool having an eccentric belt bearing surface having a variable radius and a portion of which substantially aligns with a pulley groove. What is needed is a belt installation tool having a hole for receiving a socket for engaging a pulley bolt. What is needed is a belt installation tool wherein the belt bearing surface has a radius substantially equal to a pulley radius. What is needed is a belt installation tool having a surface normal to the belt bearing surface for urging a belt into a pulley groove. The present invention meets these needs.

SUMMARY OF THE INVENTION

The primary aspect of the invention is to provide a belt installation tool having an eccentric belt bearing surface having a variable radius and a portion of which substantially aligns with a pulley groove.

Another aspect of the invention is to provide a belt installation tool having a hole for receiving a socket for engaging a pulley bolt.

Another aspect of the invention is to provide a belt installation tool wherein the belt bearing surface has a radius substantially equal to a pulley radius.

Another aspect of the invention is to provide belt installation tool having a surface normal to the belt bearing surface for urging a belt into a pulley groove.

Other aspects of the invention will be pointed out or made obvious by the following description of the invention and the accompanying drawings.

The invention comprises a belt installation tool for installing a flexible belt on a pulley. The tool comprises an eccentric belt bearing surface. On one side, the radius of the tool is substantially equivalent to the radius measured from a pulley center to a pulley rim or flange. The bearing surface on this side of the tool stretches the belt and guides the belt into a pulley groove. To avoid damaging the belt the radius of the tool belt bearing surface and the pulley flange should be substantially equal over a substantial length of the tool. Centric to the tool radius a hole is provided to accommodate a single-end socket that projects through the tool to engage a crankshaft or pulley bolt, hence, the belt installation tool is centered to the pulley along the socket centerline. The tool and pulley are then turned with a ratchet attached to the socket. The belt is moved axially from the tool into the pulley grooves by a leaderblock, which is provided at the maximum tool radius on the belt bearing surface adjacent to the pulley grooves. By turning the tool about the crankshaft the leaderblock presses the belt flank causing it to move it into the pulley grooves. The leaderblock also comprises a lip to engage a pulley rim.

BRIEF DESCRIPTION OF THE DRAWINGS

The accompanying drawings, which are incorporated in and form a part of the specification, illustrate preferred embodiments of the present invention, and together with a description, serve to explain the principles of the invention.

FIG. 4 is a perspective view of the tool in use.

DETAILED DESCRIPTION OF THE PREFERRED EMBODIMENT

Figure 1:
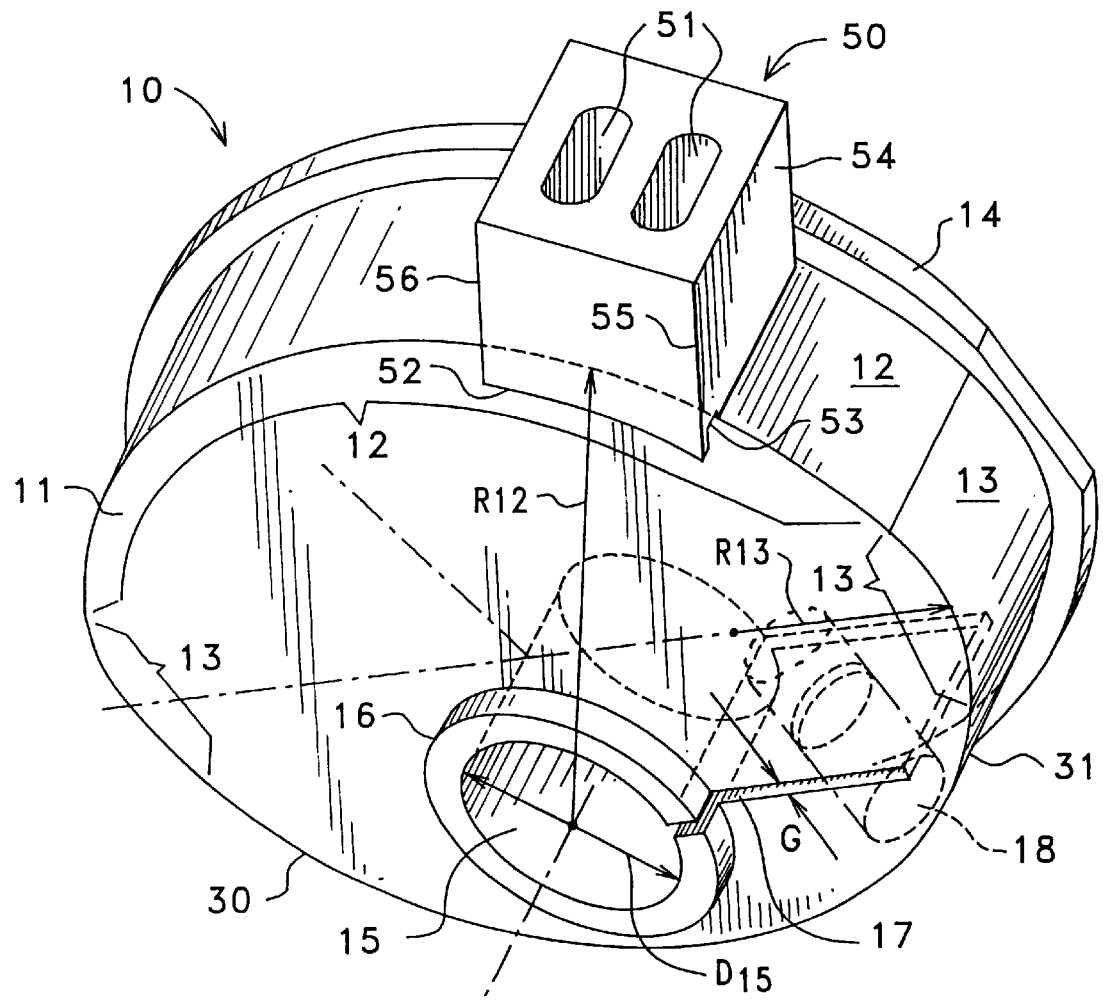
FIG. 1 is a rear perspective view of the belt installation tool.

FIG. 1 is a front perspective view of the belt installation tool. Tool 10 comprises body 11. Body 11 comprises belt bearing surface 12 and belt bearing surface 13. Surface 12 describes radius R12 and surface 13 describes radius R13. Radius R12 is centered at the center of hole 15. Radius R13 is less than radius R12.

Hole 15 in body 11 has a diameter D15. Ridge 16, which provides a bearing surface for placing the tool against a pulley, encircles hole 15. Slot 17 is cut on a radial from hole 15. Slot 17 has width G. Hole 18 traverses slot 17. Hole 18 is threaded to accommodate a fastener 19 (not shown). A ratchet socket (not shown) is inserted into hole 15. Then fastener 19 is tightened, compressing slot 17 and thereby hole 15 about the socket, firmly affixing the tool to the socket.

Edge 14 extends about an outer portion of the tool. Edge 14 is a normal surface which prevents a belt from slipping from the tool when a belt is loosely looped on the bearing surface.

Block 50 is affixed to surface 12 by fasteners, such as threaded fasteners (not shown), known in the art. The fasteners are inserted through slots 51. Block 50 comprises lip 52 which engages a rim of a pulley along with slot 53. Lip 52 and slot 53 each describe a radius substantially corresponding to radius R12, although a precise equivalence is not required for proper operation of the tool.

In operation, a socket S, having a size compatible with a pulley shaft bolt, is inserted through hole 15. Fastener 19 is tightened, thereby affixing tool 10 to socket S. Lip 52 is engaged with a pulley rim. Socket S is then engaged with a crankshaft or pulley bolt C. A belt B is loosely looped about the tool on surfaces 30, 31. A ratchet is connected to the socket S. Tool 10 is turned with the ratchet, bringing belt B into contact with surface 13. As the ratchet is turned further, tool 10 turns under belt B until belt B engages surface 12. Since radius R12 is substantially equivalent to a radius of a pulley, the belt when it engages surface 12 will be substantially adjacent to the pulley grooves. As the tool is turned further, the belt engages edge 55 of leaderblock 50. Engagement with edge 55 urges a belt B into the pulley grooves. As the tool is turned further, the belt trains into the pulley grooves. Once the tool completes a full turn, the belt is fully engaged in the pulley groove and disengaged from the tool. The tool is then removed from the crankshaft bolt.

Figure 2:
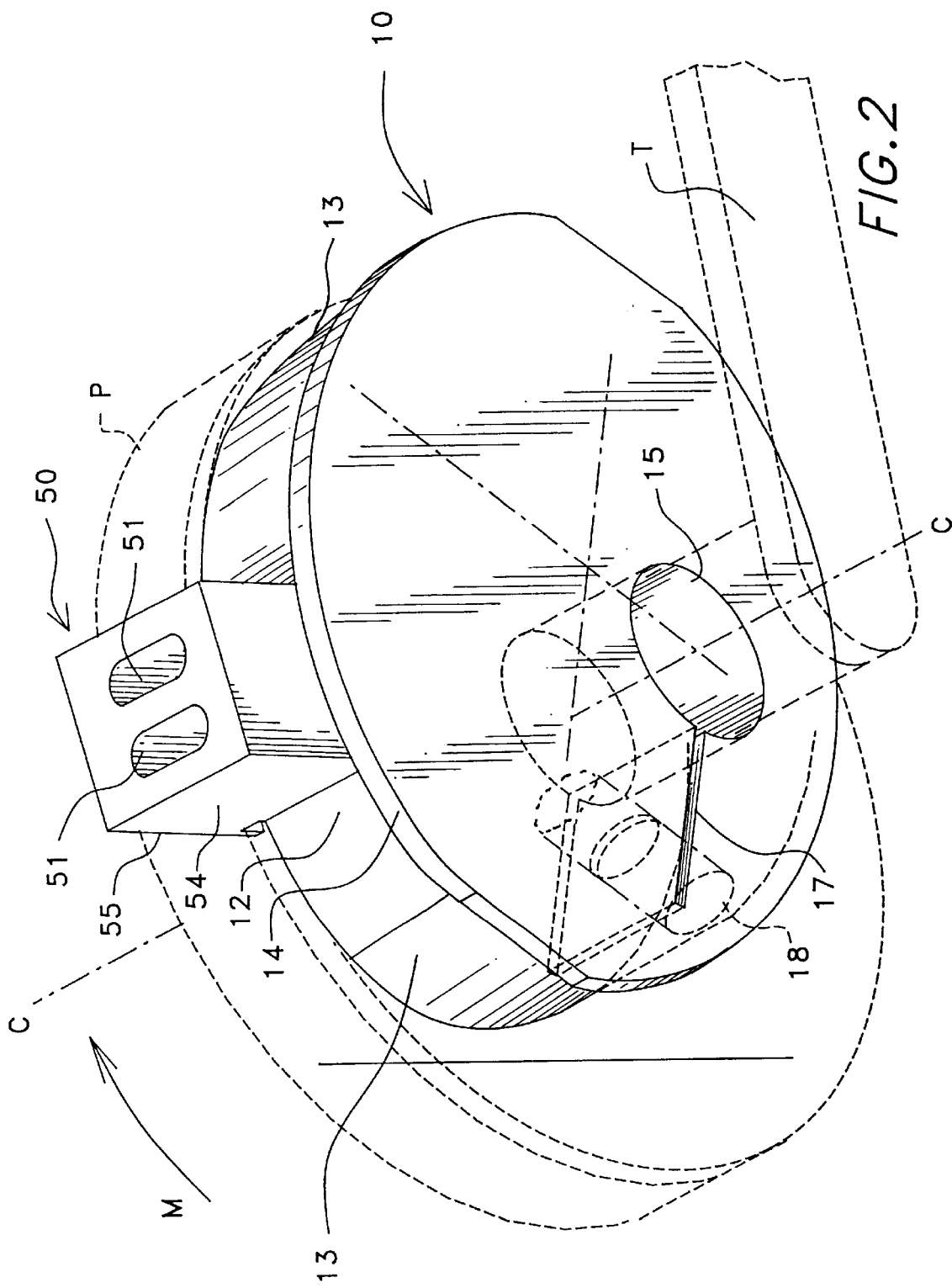
FIG. 2 is a front perspective view of the tool.

FIG. 2 is a front perspective view of the tool. Hole 15 extends from the front of the tool to the back as described in FIG. 1. Leaderblock 50 is shown mounted to surface 12.

Figure 3:
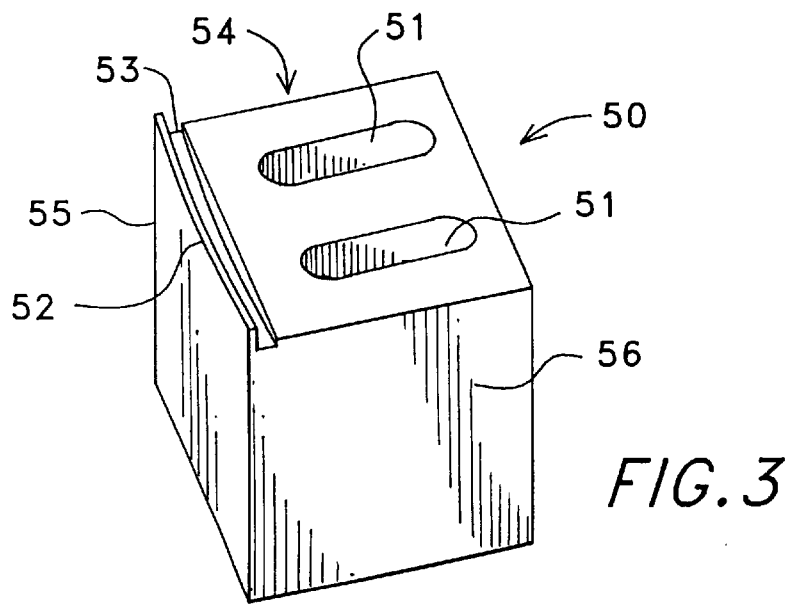
FIG. 3 is a perspective view of the mating surface of the leaderblock.

FIG. 3 is a perspective view of the mating surface of the leaderblock. Slots 51 extend through block 50. Lip 52 and slot 53 engage a rim of a pulley. Fasteners, such as threaded fasteners (not shown), extend through slots 51 to affix the block to surface 12. Slot 53 comprises a slight radius centered on a center axis of hole 15 to conform to the curve of the pulley rim. In operation, lip 52 engages the rim of a pulley while the socket extending through hole 15 engages a shaft bolt, thereby firmly attaching the tool to a pulley for installing a belt. Block surface 54 and block surface 56 comprise ends of block 50.

FIG. 4 is a perspective view of the tool in use. Tool 10 is shown with a socket tool T engaged through hole 15. Socket S engages a pulley bolt (not shown). Initially, belt B is loosely engaged with surfaces 12 and 13 with a portion engaging the pulley P as shown. As the tool and pulley are turned in direction M by a user, belt B is gently urged into a pulley groove by interaction with block 50. The belt fully engages a pulley grove upon completion of one revolution of the pulley and tool.

Although a single form of the invention has been described herein, it will be obvious to those skilled in the art that variations may be made in the construction and relation of parts without departing from the spirit and scope of the invention described herein.

I claim:
1. A belt installation tool comprising:
   a body describing a hole and having a belt bearing surface;
   a block extending from the belt bearing surface, the block having a lip for engaging a pulley rim; and
   the hole alignable with a pulley shaft bolt such that a portion of the belt bearing surface is adjacent to a pulley groove;
   the block affixed to the belt bearing surface at a maximum radius and having a belt urging surface extending substantially normal to the belt bearing surface; and
   the belt bearing surface further comprises a variable radius, the radius decreasing in a direction away from the block to a minimum radius adjacent to the hole.
2. The belt installation tool as in claim 1, further comprising:
   a surface substantially normal to the belt bearing surface, the surface extending from an edge of the belt bearing surface opposite a pulley rim.
3. The belt installation tool as in claim 2, further comprising:
   a slot having a width extending radially from the hole whereby a fastener is used to compress the groove width and thereby decrease the radius of the hole, whereby the tool grips a shaft.
4. The belt installation tool as in claim 3, wherein the maximum radius is substantially equivalent to the radius of a pulley rim.